US005457639A

United States Patent [19]
Ulich et al.

[11] Patent Number: 5,457,639
[45] Date of Patent: Oct. 10, 1995

[54] IMAGING LIDAR SYSTEM FOR SHALLOW AND COASTAL WATER

[75] Inventors: Bobby L. Ulich; John McLean, both of Tucson, Ariz.; R. Norris Keeler, McLean, Va.; Kirk J. Daniels, Suffield, Conn.

[73] Assignee: Kaman Aerospace Corporation, Bloomfield, Conn.

[21] Appl. No.: 774,663

[22] Filed: Oct. 11, 1991

[51] Int. Cl.⁶ .................. H04N 7/00; G01S 7/40
[52] U.S. Cl. .......................... 364/516; 356/5
[58] Field of Search .............. 358/95, 99; 356/342; 364/516

[56] References Cited

U.S. PATENT DOCUMENTS

| | | |
|---|---|---|
| 3,833,904 | 9/1974 | Gebhardt et al. ............. 342/88 X |
| 4,754,151 | 6/1988 | Billard . |
| 4,757,200 | 7/1988 | Shepherd . |
| 4,964,721 | 10/1990 | Ulich et al. ............. 358/95 X |
| 5,243,541 | 9/1993 | Ulich ............. 358/95 X |

FOREIGN PATENT DOCUMENTS

0422415A2  9/1990  European Pat. Off. .

Primary Examiner—Ellis B. Ramirez
Attorney, Agent, or Firm—Fishman, Dionne & Cantor

[57] ABSTRACT

An imaging lidar system for underwater applications is presented which is well suited for imaging and detecting underwater targets suspended above and on the bottom in shallow and coastal water. The present invention provides the capability for rapid and reliable search, detection, classification and localization of objects in the surf zone which may present hazards to navigation and utilization of coastal areas as well as undesirable effluents and biological fouling of underwater objects. The present invention provides an improved bottom tracker, improved ability to deal with brightness variation and surface glint, and computerized real time detection algorithms.

10 Claims, 4 Drawing Sheets

IMAGING LIDAR SYSTEM FOR SHALLOW AND COASTAL WATER

BACKGROUND OF THE INVENTION

This invention relates generally to a sensor system for remote detection and imaging of objects in a backscattering medium such as water. More particularly, this invention relates to a method and apparatus for detecting, locating and/or imaging underwater objects in shallow water and in coastal regions from an airborne platform using a novel imaging lidar (light detection and ranging) system which improves imaging in such shallow water areas.

It is desirable in a number of military and civilian applications to search a volume within a backscattering medium for the presence of certain targets. For instance, moored or bottom mines deployed in ocean shipping lanes are a hazard to navigating ships used both for military and for commercial purposes. For other civilian applications such as law enforcement on the ocean, it is desirable to detect the presence of submerged fishing nets or drug-carrying containers used in smuggling contraband. In or near harbors and beaches, it is also desirable to detect submerged obstructions, cables, pipelines, barrels, oil drums, etc. In strictly military applications, anti-submarine warfare demands an effective means of detecting and locating submarines.

Presently, cumbersome and time consuming wire line devices must be used for detecting underwater targets from remote airborne locations. These devices are lowered into the water and are easily subject to damage and loss. Also, wire line devices make target searching relatively slow and can only detect targets without providing visual imaging.

An improved and novel system for remote detection and imaging of objects underwater (or objects obscured by other backscattering media which are at least partially transmitting to light such as ice, snow, fog, dust and smoke) from an airborne platform has been described in U.S. Pat. No. 4,862,257 and U.S. Pat. No. 5,013,917, both of which are assigned to the assignee hereof and incorporated herein by reference. The imaging lidar system of U.S. Pat. No. 4,862,257 utilizes a laser to generate short pulses of light with pulse widths on the order of nanoseconds. The laser light is expanded by optics and projected down toward the surface of the water and to an object or target. U.S. Pat. No. 5,013,917 relates to an imaging lidar system intended for night vision.

Imaging lidar systems of the type described hereinabove are also disclosed in commonly assigned U.S. Pat. No. 4,964,721 and U.S. Pat. No. 4,967,270, both of which are incorporated herein by reference. U.S. Pat. No. 4,964,721 relates to an imaging lidar system which controls camera gating based on input from the aircraft onboard altimeter and uses a computer to thereby adjust total time delay so as to automatically track changing platform altitude. U.S. Pat. No. 4,967,270 relates to a lidar system employing a plurality of gated cameras which are individually triggered after preselected time delays to obtain multiple subimages laterally across a target image. These multiple subimages are then put together in a mosaic in a computer to provide a complete image of a target plane preferably using only a single light pulse.

Still other imaging lidar systems are disclosed in commonly assigned U.S. Pat. Nos. 5,029,009 and 5,034,810, both of which are incorporated herein by reference. U.S. Pat. No. 5,029,009 describes an imaging lidar system incorporating an imaging camera having a plurality of gating electrodes on a focal plane and means for producing variable time delay gating across an image viewed by the focal plane. U.S. Pat. No. 5,034,810 relates to a two wavelength lidar imaging system for underwater application utilizing image subtraction to detect passage of internal waves or other anomalies under water.

U.S. Ser. No. 07/565,631, filed Aug. 10, 1990 (now U.S. Pat. No. 5,231,401) which is also assigned to the assignee hereof and fully incorporated herein by reference, relates to an airborne imaging lidar system which employs a plurality of pulsed laser transmitters, a plurality of gated and intensified array camera receivers, an optical scanner for increased field of regard, and a computer for system control, automatic target detection and display generation. U.S. Ser. No. 565,631 (U.S. Pat. No. 5,231,401) provides a means for rapidly searching a large volume of the backscattering medium (e.g., water) for specified targets and improves upon prior art devices in performance as a result of having more energy in each laser pulse (due to simultaneous operation of multiple lasers) and a more sensitive detection system using multiple cameras. The several cameras may be utilized to image different range gates on a single laser pulse or several cameras can be gated on at the same time to provide independent pictures which can then be averaged to reduce the noise level and improve sensitivity. Both of these improvements result in higher signal-to-noise ratio and thus higher probability of detection or greater range of depth capability.

Imaging lidar system of the type hereinabove discussed are often used in conjunction with computerized automatic target detection (ATD) systems for detecting, locating and identifying targets from a plurality of two dimensional images. Examples of such ATD systems are described in commonly assigned U.S. application Ser. Nos. 565,425 (U.S. Pat. No. 5,233,541) and 565,424 (U.S. Pat. No. 5,267,329), both of which were filed on Aug. 10, 1990 and are incorporated herein by reference.

While the imaging lidar systems described above are well suited for their intended purposes (particularly deep ocean detection), there continues to be a need for imaging lidar systems of this type which have improved operational performance and efficiency in the imaging of underwater targets found in shallow water and/or coastal regions. Such coastal zone surveillance presents an even more challenging problem than deep ocean detection. These difficult problems are encountered as a result of the more challenging conditions in shallow water than those encountered previously in deeper water. These factors include highly variable conditions at the air/water interface such as breaking waves, foam and spray, spatially varying bottom depths both parallel and perpendicular to the coastline and the need for high spatial resolution in order to detect and classify small objects which may be partly hidden in the sand.

Notwithstanding the foregoing, the need for imaging lidar systems, suitable for such coastal and shallow water applications is of great interest to government and commercial activities. For example, there continues to be an increasing need for identification of natural and man made obstacles and hazards in the coastal regions. Obvious applications include identifying favorable sites for construction and utilization of shallow water ports and moorings, surveillance of coastal areas to monitor changes in the surf zone as a result of sediment loading or storm activity, and localization and identification of underwater debris as part of search and rescue operations. Other applications involve the detection of obstacles, mines and hidden explosive charges in shallow waters, offshore and in certain riverine environments. Natural and man made underwater effluent and biological fouling of underwater intake and discharge lines such as that caused by the Zebra mussel in the Great Lakes also needs to be identified.

SUMMARY OF THE INVENTION

The present invention overcomes deficiencies in the prior art by providing an apparatus and method for detecting, classifying and localizing objects in the surf zone and in shallow water. This invention thus comprises an airborne imaging lidar system for detection and classification of objects in the surf zone of coastal waters. Preferably, the lidar transmitter is a repetitively pulsed Nd:YAG laser illuminating a portion of the coastal marine area for imaging by a gated camera (e.g., CCD camera) with optimized gating time delay. The present invention includes high spatial resolution and target detection algorithms to classify objects and discriminate against clutter. As a result, the present invention is capable of rapid search of coastal areas, performs real time automatic target detection, noise rejection and classification, and is capable of both day and night operations under a wide range of sea state and water clarity.

Important features of this invention include multiple imaging cameras to provide high spatial resolution, a bottom tracker to maintain camera gating at the optimum local bottom depth, a specialized beam projection system to minimize brightness variations across the field of view and which optimizes the spatial relationship of the transmitted light to the geometry of the receiver optics, and finally, target detection computers to provide real time detection and classification of surf zone obstacles. The imaging system of this invention is superior to alternative search systems due to its enhanced capability of high search rate, broad area instead of narrow area illumination, high spatial resolution and real time detection and classification.

As mentioned, particular factors affecting surf zone surveillance include highly variable conditions at the air/water interface such as breaking waves, foam, and spray, spatially varying bottom depths both parallel and perpendicular to the coastline, and the necessity for high spatial resolution for detection/classification of small objects which may be partially obscured by sand. These factors are addressed in this invention by using multiple cameras to achieve exceptionally high resolution, utilizing automatic gating features to adapt to rapidly varying bottom depths, and incorporating high speed processors to mitigate against surface wave effects as well as ambient noise from other sources such as sunlight and performing real time target detection and classification.

The present invention provides the capability for rapid and reliable search, detection, classification, and localization of objects in the surf zone, which may present hazards to navigation and utilization of coastal areas. This invention is capable of rapidly surveying large areas of coastline, providing real time detection and classification, and displaying the results to a human operator to allow for real time assessment of potential hazards in the surf zone. This invention is of great interest to both military and commercial application for identification of man-made and natural obstacles and hazards in coastal regions. It will be appreciated that while prior art imaging lidar systems such as described in aforementioned U.S. Pat. No. 4,862,257 and U.S. Ser. No. 565,631 (U.S. Pat. No. 5,231,401) are well suited for deeper water detection, the methods and apparatus for the airborne imaging LIDAR systems of this invention optimize the configuration for surf zone surveillance resulting in substantial improvement.

As will be seen, the elaborate step by step spot illumination associated with certain prior art devices is not needed for following varying underwater contours. Instead, the wide area illumination used in this invention, with gating control based on the bottom echoes is more than adequate for illuminating such varying underwater contours.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DETAILED DESCRIPTION OF THE INVENTION

Detection, classification and localization of objects in the surf zone presents a formidable challenge to remote sensors. The instrument must have high spatial resolution to a adequately classify obstacles and discriminate against clutter, the sensor must be adaptable to rapidly varying bottom depths and sea surface elevations, and must contend with large variability in sea surface conditions (e.g., breaking waves and foam), and be robust with respect to variable conditions in ambient light and water clarity. These requirements are met in the present invention by using active illumination (e.g., laser) to overcome variations in natural illumination, a gateable camera for discrimination against ambient noise, automatic gate timing to follow variations in bottom depth, an imaging array to provide high spatial resolution and a high speed computer for automatic target detection, classification and display.

Particularly important features of this invention include the incorporation of a bottom tracker for automatic gate adaptation, a novel arrangement of cameras to mitigate against brightness variations and achieve exceptional resolution and the use of multiple computers to perform real time sensor control, detection and classification. The sensor block diagram of the present invention is illustrated in FIG. 1.

For purposes of illustration, the present invention will be described with respect to a sensor configuration for integration into high speed, fixed wing aircraft. However, it will be appreciated that the present invention is intended to include numerous packaging variants to allow deployment on a wide variety of both fixed and rotary wing aircraft (both piloted and unmanned), while requiring minimal modification to the host platform.

Figure 1:
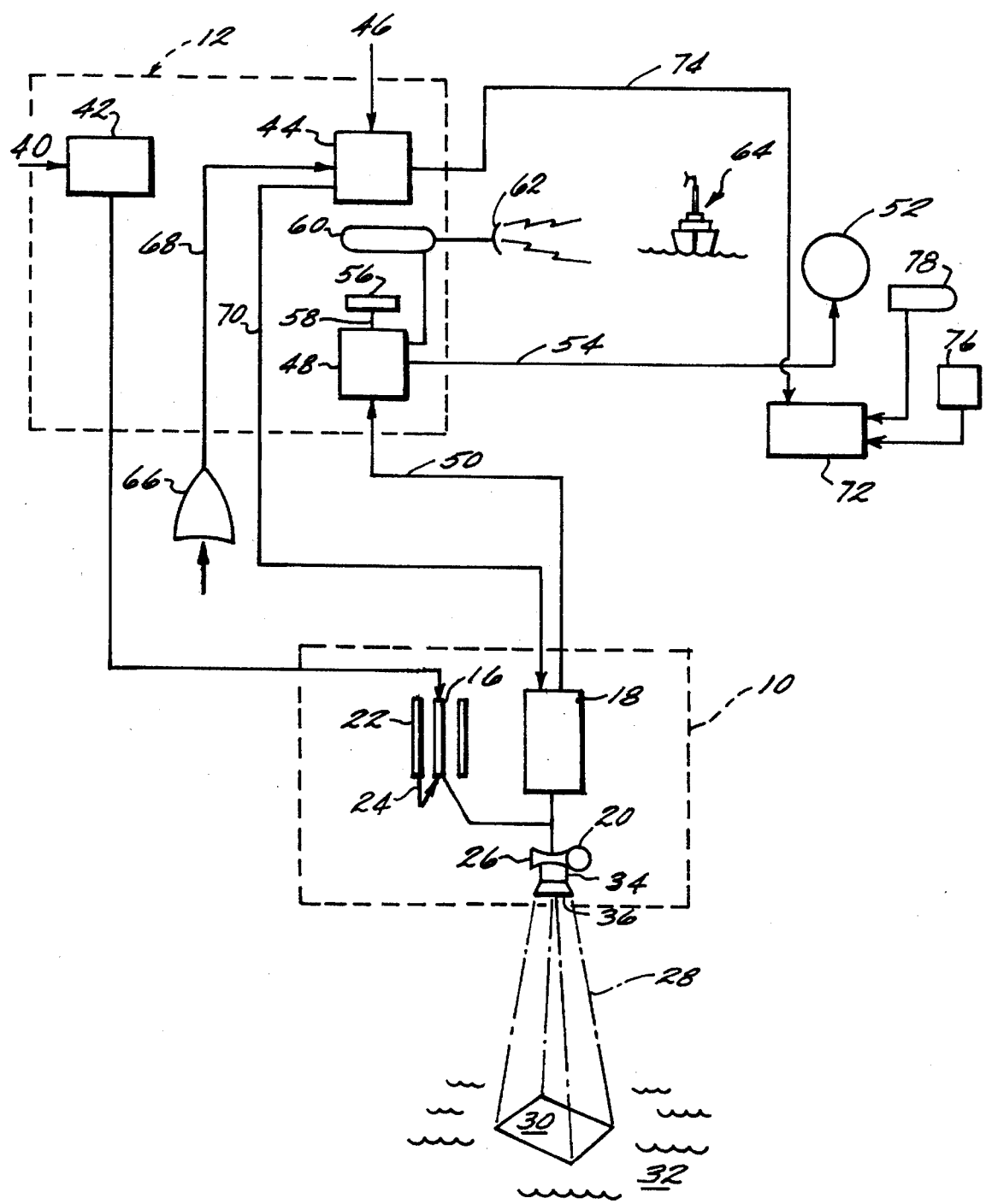
FIG. 1 is a block diagram of an imaging lidar system in accordance with the present invention.

Referring now to FIG. 1, the sensor comprises three physical units; an externally mounted pod 10, an equipment rack 12, and a cooling system 22. Pod 10 contains the laser transmitter 16, the cameras 18, the scanner 20 and the cooling system 22 which provides the necessary cooling for the laser transmitter through coolant lines 24. The laser transmitter 16 characteristics include short pulses for range resolution and daylight noise rejection (less than 20 nsec pulse width), wavelength chosen for optimal penetration into seawater (500 to 550 nm for coastal water), and pulse energy and PRF chosen to meet detection depth and area coverage requirements, respectively. Current technology favors use of a flashlamp as described in U.S. Pat. No. 4,862,257 or diode pumped doubled Neodymium-YAG lasers as described in U.S. patent application Ser. No. 632,377, filed Dec. 21, 1990 (U.S. Pat. No. 5,091,778). The entire transmitter assembly consists of the laser 16, a beam projector 26 and scanner 20. Cooling is provided within the pod 10 through cooling lines 24 from the cooling system 22. The beam projector 26 modifies the spatial cross section of the laser beam 28 to provide the appropriate beam footprint 30 at the water surface 32. The scanner 20 steers the output of the beam projector to provide both an adequate swath width and to compensate for aircraft roll variations.

The receiver assembly comprises the scanner 20, beam collection optics (co-aligned with the transmitter) 34, a narrow band optical filter 36, and camera 18. Camera 18 (either one or more cameras may be used) comprises a photocathode optimized for maximum response at the transmitted wavelength, a gateable microchannel plate (MCP) which provides both fast gating and low noise amplification, one or more intermediate gain sections, and a charge coupled device (CCD) to digitize the image outputs as in U.S. Pat. No. 4,862,257. Camera characteristics include the capability of short gating for ambient (sunlight) noise rejection and backscatter noise mitigation (water backscatter); high spatial resolution for target identification, classification, and clutter rejection. In accordance with the present invention, camera 18 also includes an adequate format to cover the transmitter footprint.

The particular choice of CCD is driven by the resolution requirements for target identification. System resolution cannot be increased arbitrarily, however, since environmental effect of surface wave roughness and in water multiple scatter will place an upper bound upon attainable system resolution.

It should be borne in mind that the pod 10 configuration is given only as an example to illustrate the configuration of the present embodiment. Other configurations are possible which involve pod placement internal to the aircraft fuselage.

Receiver field of view is constrained by brightness variation due to slant range variation at non-normal look angles. To maintain adequate contrast resolution across the image and to keep the image levels within the intensity dynamic range of the CCD, the field of view is constrained to limit brightness variations to less than a factor of about four. The maximum field of view is constrained by:

$$\delta\theta < (n\cos^2\theta / H\sin\theta)(\ln B / 2k_a)$$

where H is the altitude, $\theta$ is the incidence angle from the normal, n is the index of refraction of seawater, $k_a$ is the attenuation coefficient for the water, and B is the maximum permissible brightness variation. With the scanner operating in the roll direction, this constraint provides an upper limit on the instantaneous field of view (IFOV) along the roll axis direction. In the direction of platform motion, the field of view is determined primarily by speed of advance of the aircraft platform. For high speed vehicles, the along track footprint can become quite large, and the sensor field of view is divided between multiple cameras to maintain a modest aspect ratio for each individual camera.

The equipment rack 12 provides system power, system control, and data acquisition/processing functions. System power is derived from primary aircraft power 40 through conditioning equipment 42 contained in the rack. An instrument control computer 44 provides command, control and timing functions for the overall system. Computer 44 also uses aircraft navigation and attitude information 46 to provide precise localization information for the detected obstacles. This can take the form of GPS inputs, loran or a target detection computer input based on navigational aids, or celestial fixes. A target detection computer 48 receives incoming raw sensor data (digital) through transmission line 50, and performs the appropriate normalization and filtering functions, identifies probable targets by comparison with a preset threshold, and alerts the operator at a visual display monitor 52 through line 54 with a highlighted video message and an enhanced display of the suspected target. A data recorder 56 is included to provide data archives for post-mission analysis. The video data from the camera(s) 18 are transmitted through line 50 to the target data computer 48 for analysis, but is subsequently transmitted through line 58 to the data recorder 56, as well as to the visual display monitor 52 for real time viewing. The present invention has the capability of recalling data from the data recorder 56 for replay. If required, the data can be transmitted for real time remote viewing by the data link 60 and its transmitter antenna 62 to another location on shore or off shore (for example, ship 64).

Figure 5:
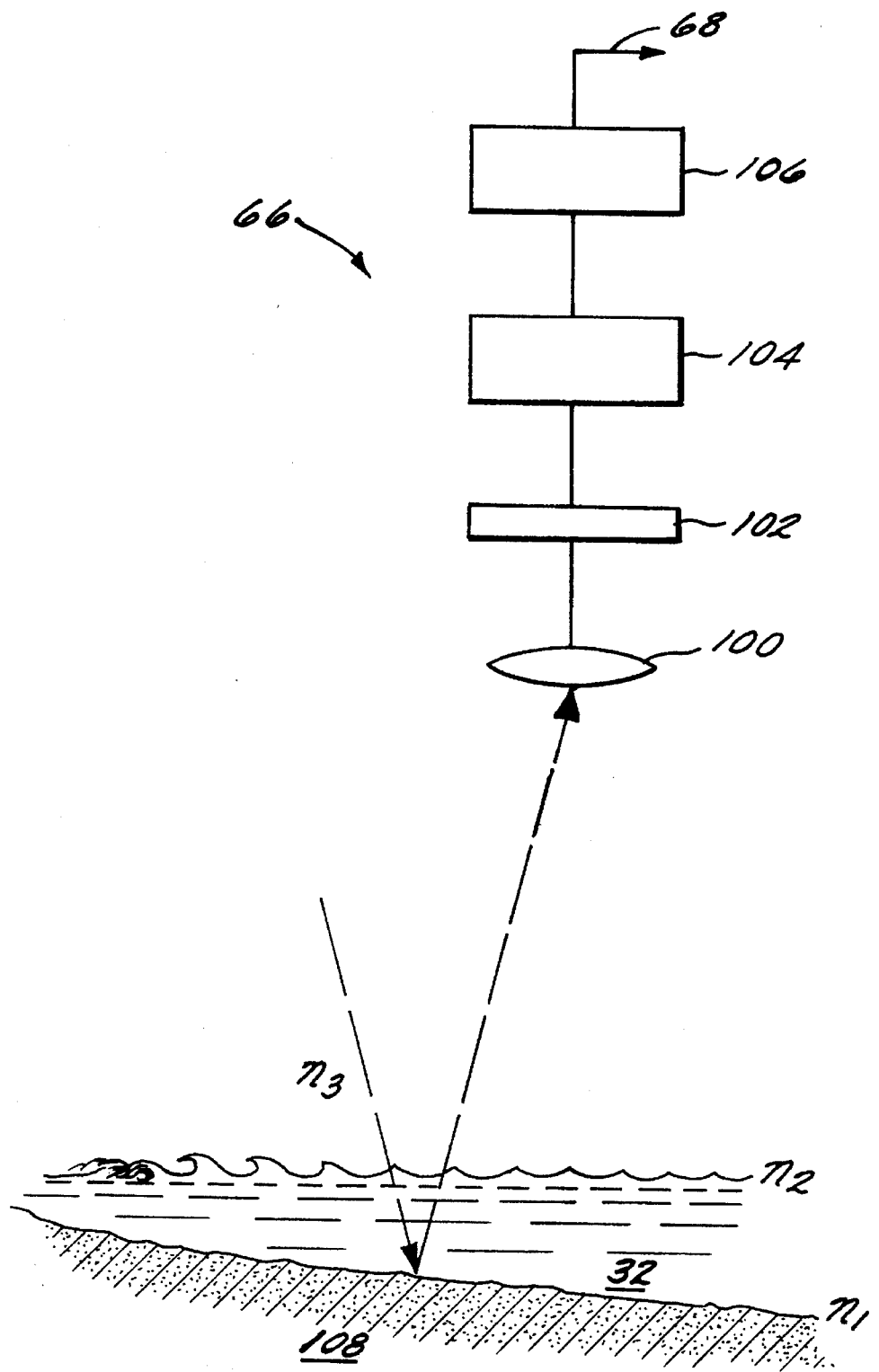
FIG. 5 is a schematic diagram of a bottom tracker used in the imaging lidar system of the present invention.

The automatic gating component of the system is an important feature of this invention. To accommodate rapid variations in bottom depth as the aircraft maneuvers along the coastline, a separate time resolved bottom detector 66 is used to determine slant range to the local bottom. Timing information derived from this sensor is fed through line 68 to the instrument control computer 44 and is sent through line 70 to trigger the gate circuits of the camera(s) 18 gates to ensure that the cameras follow the varying bottom depth. With reference to FIG. 5, bottom tracker 66 comprises input optics 100 (e.g., suitable lens), a narrow bandpass optical filter 102 matched to the laser wavelength, a photomultiplier tube or avalanche photodiode 104 and a preamplifier/discriminator 106 for detecting the bottom reflection. As shown in FIG. 5, bottom tracker 66 determines the varying range between tracker 66 and the bottom 108.

The scanner 20 comprises an elongated mirror which can scan the transmitted beam and receiver fields of view along a common axis as described in U.S. Ser. No. 565,631. By scanning the optical axis in the roll direction, both a larger swath width and roll compensation are achieved.

The sensor station 72 is the aircrew interface for system control and monitoring. It includes high level control of system operation, presents status information to the operator, and presents enhanced target images for operator confirmation. The operator controls the entire mission through the mission control panel 76. This part of the sensor station involves only the laser transmitter on-off and standby switches. The data entry device 78 is used to set the various operating parameters to be used during the operation and are provided as input to the instrument control computer 44 through the transmission line 74.

Figure 2:
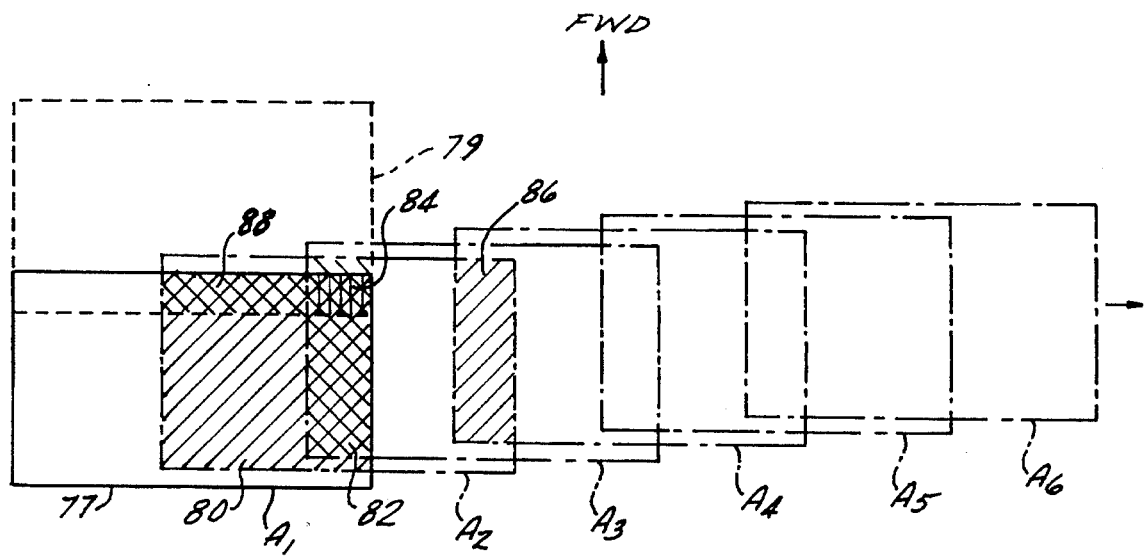
FIG. 2 is a raster scanning pattern in accordance with the present invention.

Referring now to FIG. 2, an example of a novel scan pattern for a high resolution, high speed surveillance system is shown. For the search conditions, it is assumed that six cameras 18 are utilized to cover the highly elongated footprint of the transmitter. A larger or smaller number of cameras can be used, limited only by cost or practical considerations. The six camera configuration is chosen only as an example. In accordance with the present invention, this novel division of the sensor field of view among multiple cameras avoids difficulties associated with viewing large aspect ratio areas with a single camera. In this example, the aspect ratio for an individual camera is 2:1, which is readily accommodated with commercially available CCD hardware. Note also that the high degree of overlap between cameras, laser shots, and scan lines provides for precise image to image intercalibration and registration, and allows for large scale scene reconstruction. Previous attempts at scene reconstruction using flying spot scanner and high pulse repetition frequency sensors have suffered due to lack of such overlap and intercalibration capability. Each camera views backscatter from respective areas $A_1$, $A_2$, $A_3$, $A_4$, $A_5$ and $A_6$. The initial transverse scan 77 (solid line) is shown followed by the second scan 79 (dotted line). Overlaps 80, 82 and 84 between cameras prevent loss of target between scanned areas. Additional overlaps are provided by successive camera images, as in the area 86, and by the next row of images after flyback 79 (such as area 88). The laser transmitter beam illuminates each of the imaged areas $A_1$, $A_2$, $A_3$ etc. in turn so that the area illuminated by the laser transmitter coincides exactly with the area imaged by the cameras.

Figure 3A:
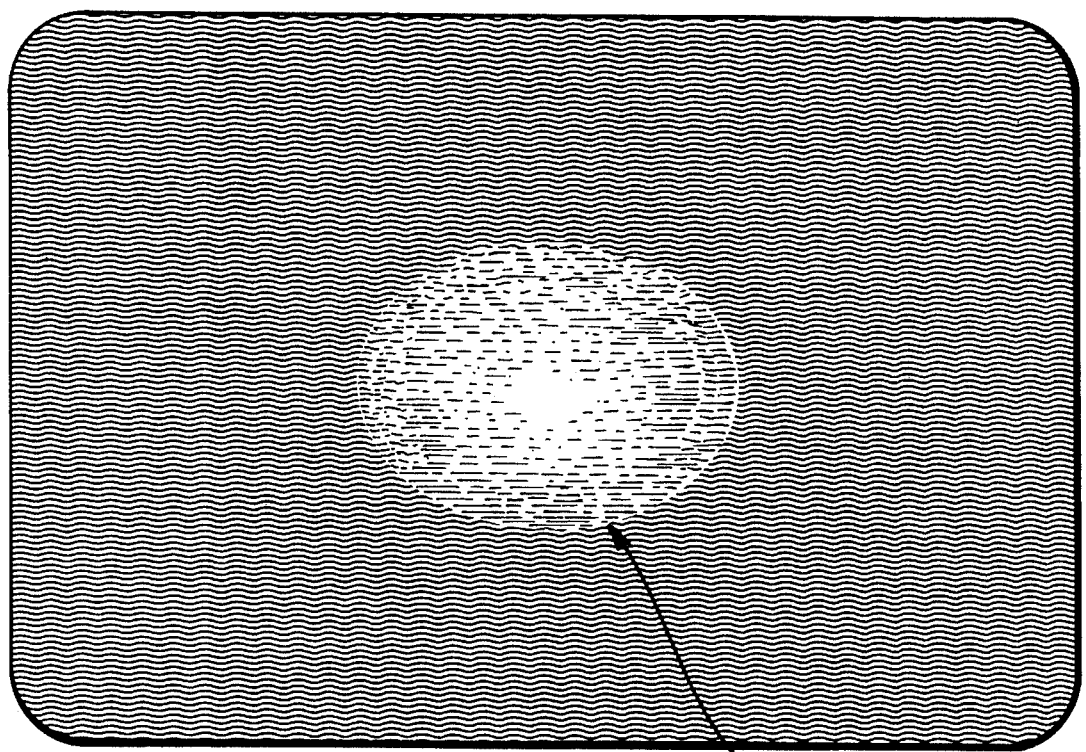
FIG. 3A is a front elevation view of a video screen illustrating an image of a standard resolution target viewed in reflection through surf conditions in accordance with the present invention.
Figure 3B:
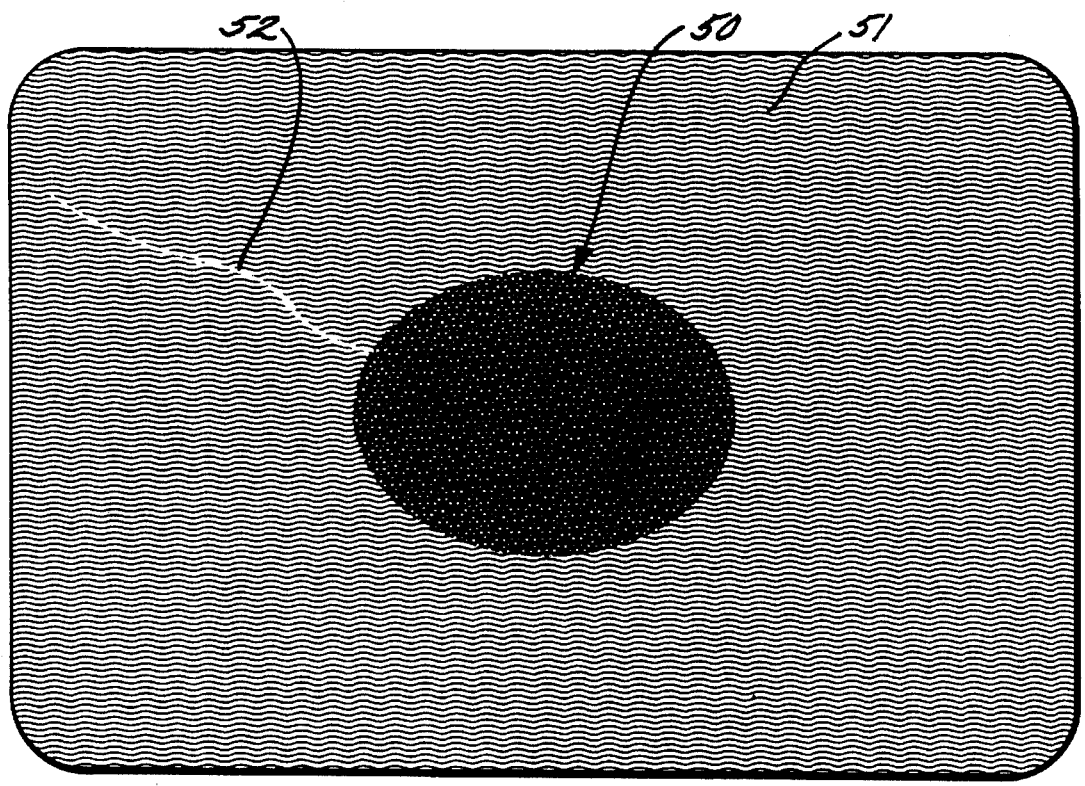
FIG. 3B is a front elevation view of a video screen illustrating an image of a standard resolution target viewed in obscuration through surf conditions in accordance with the present invention.

Referring to FIGS. 3A and 3B, the results of actual scanning are shown. FIG. 3A shows a buoyant opaque object 45 suspended in a Scripps Ocean Tank. It is in 30 feet of sea water, suspended 15 feet from the tank bottom. It is spherical in shape, as can be seen from the intensity pattern which peaks in the object's center and decreases to the outer boundary of the image. The camera is gated to eliminate surface glint and reflections from the bottom.

FIG. 3B shows the bottom of the Scripps Ocean Tank. Here the gate was chosen to illuminate the water below the suspended opaque object, and the tank bottom. The object is now seen in obscuration, or a shadow 50 cast by the object in the field of upward-welling illuminating light. The bottom is intensely illuminated over the region 51, and a small tether cord 52 can actually be seen on the bottom, again illustrating the ability of this embodiment to identify underwater objects in coastal or lattoral regions.

Figure 4:
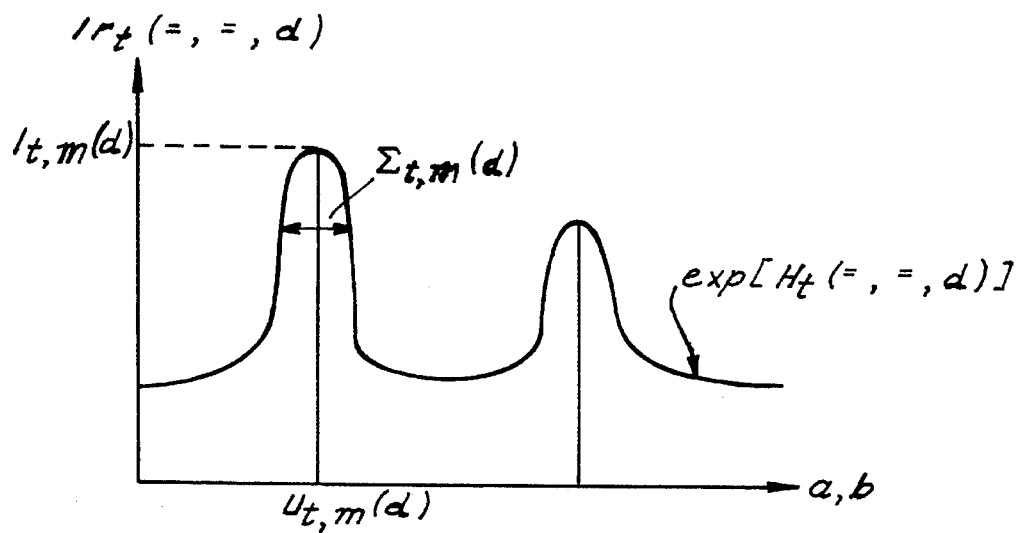
FIG. 4 is a diagram showing the likelihood ratio statistic $Ir_t$ in (a,b) dimensions.

Referring now to FIG. 4, automatic detection, localization, and classification will be performed on a separate target detection computer 10 previously shown in FIG. 1. The amount of data in an imaging LIDAR system depends upon the selected search volume and for large volumes, the amount of data is immense. Accordingly, processing the data presents a formidable problem, both in terms of memory capacity and processor speed since real time detections are required. Single frame processing limits the memory requirement to one frame of data, but at the loss of signal-to-noise ratio that could be achieved through interframe correlation.

The target detection algorithm presented herein addresses that problem by performing a novel data reduction step to minimize the load on both the memory and the processor. The algorithm achieves this reduction by retaining only information about each frame which is important for target detections. Sufficient statistical information is retained to perform a Bayesian update when part of the search area is revisited during the search. By fusing the available information from scan to scan, signal-to-noise ratio, and, therefore, the potential for target detection, is increased.

We first briefly outline the method, suppressing the mathematical notation. The data is obtained over time as a sequence of two dimensional arrays of numbers. The data is assumed to follow a multivariate Gaussian distribution with known covariance structure. The target signature is also assumed known, and will depend upon the position of the frame with respect to the target.

We will compute the likelihood ratio over all data frames of a hypothesis that the target is centered in a particular location within the search volume with respect to the null hypothesis that the target is not present. We will do this for selected target locations within the search volume resulting in a multiple frame likelihood function. This multiple frame likelihood function forms the basis of any optimal statistical detection algorithm.

Because the noise field is correlated, and because a convolution in spatial coordinates amounts to a multiplication in transform coordinates, the likelihood calculations are best done in transform coordinates. Thus, the data, the target signature, and the covariance structure of the noise field are transformed using a discrete Fourier transform.

The logarithm of the multiple frame likelihood function splits into two terms, one, called the matched filter (MF), which depends on the data, and another, called the signal-to-noise ratio (SNR), which depends upon the target signature relative to the noise model and the number of scans that we have on the particular area. If we assume that the SNR term is constant over the hypotheses considered, and that the scans are sufficiently separated in time to decorrelate the data in the time dimension, then the expression for MF can be decomposed into a sum of terms which is the matched filter output for single frame processing. In terms of the likelihood function itself, this assumption allows the decomposition of the multiple frame likelihood function into a product of single-frame likelihood functions.

As a function of the hypotheses, each of these single-frame likelihood functions is of a particular form. Away from the areas of signal energy, the likelihood is nearly zero, and in the proximity of a target-like object, the likelihood function will be peaked. In order to retain the important information present in this likelihood function for integration with future information, while at the same time reducing the vast quantity of numbers (or data), we apply the following procedure. We select a fixed number of peaks in the likelihood function, and then store their location, their height above the surrounding flat area (e.g., base level), and some information about their spread. In mathematical terms, we represent each peak as a two-dimensional Gaussian function, and the base level by a slowly varying function in a convenient parametric form (see FIG. 4).

Each single-frame likelihood function is represented in such a form. In order to perform the integration over time and thereby calculate the multiple frame likelihood function, we proceed in a recursive fashion. We introduce a sequence of composite multiple frame likelihood functions equal in number to the number of data frames to be processed. The kth composite multiple frame likelihood function is a fusion of the first k single frame likelihood function, and represents a summary of all of the data in the first k frames. Each of the composite multiple frame likelihood functions is in the same form as the single frame likelihood functions, namely a base level plus a number of Gaussian peaks. The k+1 composite multiple frame likelihood function can be computed from the kth composite multiple frame likelihood function and k+1 single frame likelihood function by a elegantly simple process due to the novel representation of all the likelihood functions (e.g., FIG. 4). This is an important and significant feature of the present invention.

Given a composite multiple frame likelihood function and a single frame likelihood function, each is represented in terms of a sum of base level and a number of Gaussian peaks, the fusion of these two likelihoods is again the sum of a base level and a number of Gaussian peaks. The new peaks of the new composite multiple frame likelihood function are of three types (e.g., Updated, New and Continued, see Tables 1 and 2). The parameters—location, height, spread—of the new peaks are computable in terms of the parameters of the single-frame peaks. This calculation is described in detail hereinafter.

The number of new peaks will be (N+1)(M+1)−1 if the number of peaks in the single-frame likelihood function and the composite multiple frame likelihood function being fused are N and M, respectively. In order to limit the load on the computer's memory and processor, we retain only the M most significant peaks and prune the remainder. The peaks are chosen depending upon the height parameter of the new peak. The number M can be chosen to be appropriate to the processing power and capacity of the computer being used. Tables 1 and 2 provide a clear picture of the necessary computations for fusing and pruning.

This fusing and pruning procedure is repeated until all of the data frames have been processed and the multiple frame likelihood function has been determined. Detections are called after a fixed sub volume of the search volume has has been prosecuted and no further data from the sub volume is obtained. If the multiple frame likelihood function at any location in the sub volume exceeds a threshold, a target detection is made. This process is especially well suited for long search missions where areas are not revisited during the mission.

We now present the full mathematical description of the algorithm used to perform this automated processing with reference to FIG. 4.

Definitions:

$Y_{ijt}$=Data collected in pixel i,j and at time t (possible preprocessed)

$S_{ij}(a,b,d)$=Signature anticipated in pixel i,j given the target is located at horizontal position (a,b) and is of type d.

$C_{pqs}$=covariance in noise field at spacing p,q in horizontal coordinates and s in time coordinates.

Now we define the Fourier transforms of three fundamental fields.

$$Y_{uvx} = \sum_{i,j,t} \exp\left( 2\pi \sqrt{-1} \left( \frac{iu}{N} + \frac{jv}{N} + \frac{xt}{T} \right) \right) Y_{ijt}$$

$$S_{uv}(a,b,d) = \sum_{i,j} \exp\left( \frac{2\pi \sqrt{-1}}{N} (iu+jv) \right) S_{ij}(a,b)$$

$$F_{uvx} = \sum_{p,q,s} \exp\left( 2\pi \sqrt{-1} \left( \frac{pu}{N} + \frac{qv}{N} + \frac{xs}{T} \right) \right) C_{pqs}$$

We now define the logarithm of the likelihood ratio statistic for target detection. Let $$MF_T(a,b,d) = \sum_{uvx} \frac{Y_{uvx} \overline{S_{uv}(a,b,d)}}{F_{uvx}}$$

$$SNR_T(a,b,d) = \sum_{uvx} \frac{|S_{uv}(a,b,d)|^2}{F_{uvx}}$$

$$\ln lr_T(a,b,d) = MF_T(a,b,d) - \frac{1}{2} SNR_T(a,b,d)$$

Note that the likelihood ratio is a function of hypothesized position (a,b) and type d. Note also that the detailed physical assumptions on the structure of the noise field, including solar noise from the foam are incorporated into $C_{pqs}$ (or alternatively $F_{uvx}$).

Simplifications:

1. Assume SNR is constant in position, but varies with type. This implies $$SNR_T(a,b,d) = SNR_T(d)$$

2. Assume that the noise is correlated in spatial coordinates, but not temporally. Then $$F_{uvx} = F_{uv}, \text{ and}$$

$$MF_T(a,b,d) = \sum_t \left[ \sum_{uv} \frac{Y_{uv;t} \overline{S_{uv}(a,b,d)}}{F_{uv}} \right], \text{ and}$$

$$SNR_T(d) = T \left[ \sum_{uv} \frac{|S_{uv}(o,o,d)|^2}{F_{uv}} \right].$$

Thus, $$\ln lr_T(a,b,d) = \sum_t \left[ \sum_{uv} \frac{Y_{uv;t} \overline{S_{uv}(a,b,d)}}{F_{uv}} \right] - \frac{1}{2} T \left[ \sum_{uv} \frac{|S_{uv}(o.o.d)|^2}{F_{uv}} \right]$$

Notes:

1. $\ln lr_T(a,b,d) \approx 0$ in regions of (a,b,d) space containing no signal energy (Law of Large Numbers).

2. Peaks in $\ln lr_T$ in (a,b) coordinates likely due to signal presence or false alarms will be fairly sharp, but gentle in d coordinates.

Thus, we write $$\ln lr_T(a,b,d) = \sum_t \left[ \sum_{uv} \frac{Y_{uv;t} \overline{S_{uv}(a,b,d)}}{F_{uv}} + H_t(a,b,d) \right]$$

Here $H_t(a,b,d)$ incorporates the SNR term as well as smoothly varying unmodeled effects.

Consequently, $$lr_T(a,b,d) = \prod_t \left\{ \exp\left[ \sum_{uv} \frac{Y_{uv;t} \overline{S_{uv}(a,b,d)}}{F_{uv}} \right] \exp[H_t(a,b,d)] \right\}$$

-continued $$= \prod_t lr_t(a,b,d),$$

where $$lr_t(a,b,d) = \exp\left[\sum_{uv} \frac{Y_{uv;t} \overline{S_{uv}(a,b,d)}}{F_{uv}}\right] \exp[H_t(a,b,d)].$$

Now let us consider the function $1r_t$.

The anticipated nature of the function $1r_t$ for each type d in the (a,b) dimension is depicted in FIG. 4.

Thus, we represent $1r_t$ as follows:

$$lr_t(a,b,d) = \sum_m l_{t,m}(d) \, n((a,b)|u_{t,m}(d), \Sigma_{t,m}(d)) + G_t(a,b,d) \quad (1)$$

Notes:

1. We assume $G_t(a,b,d) \approx \exp[H_t(a,b,d)]$ is slowly varying in all dimensions $$n(x|u,\Sigma) = \frac{1}{(2\pi)|\Sigma|^{1/2}} \, e^{-1/2(x-u)^T \Sigma^{-1}(x-u)}$$

3. For each t, and d,
$1_{t,m}(d)$ is a positive scaling constant $$1_{t,m}(d) = 1r_t(u_{t,m}(d)) \cdot (2\pi) \cdot |\Sigma_{t,m}(d)|^{1/2} - \exp[\, H_t(u_{t,m}(d))]$$

$u_{t,m}(d)$ is a local maximum of $MF_t$ in $R^2$ for each d.

$$\Sigma_{t,m}(d) = \left[\frac{\delta^2}{\delta x_i \delta x_j} MF_t|_{t=u_{t,m}(d)}\right]^{-1}$$

Thus, under representation (1), $$lr_T(a,b,d) \approx \prod_t \left\{ \sum_m l_{t,m}(d) \, n((a,b)|u_{t,m}(d), \Sigma_{t,m}(d)) + G_t(a,b,d) \right\}$$

$$\approx \prod_t \left\{ \sum_m l_{t,m}(d) \, n((a,b)|u_{t,m}(d), \Sigma_{t,m}(d)) + G_t(a,b,d) \right\}$$

We now describe recursive calculation of $1r_T$. First, we consider construction of $1r_t$ (a,b,d) from the likelihood ratio functions for two time periods:

$$lr_2(a,b,d) = \prod_{t=1,2} \left\{ \sum_m l_{t,m}(d) n((a,b)|u_{t,m}(d), \Sigma_{t,m}(d)) + G_t(a,b,d) \right\}$$

Depressing the d-dependence in $1, u,$ and $\Sigma$ for the moment, we have $$lr_2(a,b,d) = \sum_{m_1 m_2} l_{1,m_1} \, n((a,b)|u_{1,m_1}, \Sigma_{1,m_1})$$
$$l_{2,m_2} \, n((a,b)|u_{2,m_2}, \Sigma_{2,m_2}) +$$

$$G_1(a,b,d) \sum_{m_2} l_{2,m_2} \, n((a,b)|u_{2,m_2}, \Sigma_{2,m_2}) +$$

$$G_2(a,b,d) \sum_{m_1} l_{1,m_1} \, n((a,b)|u_{1,m_1}, \Sigma_{1,m_1}) + G_1(a,b,d) \, G_2(a,b,d)$$

Now consider the term of the form $$n[x|u_1, \Sigma_1] \cdot n[x|u_2, \Sigma_2]$$

Using simple algebra, this product may be written in the form:

$$n[x|u^*, \Sigma^*] \cdot n[u|u_1, \Sigma_1 + \Sigma_2],$$

where
1. $\Sigma^* = [\Sigma_1^{-1} + \Sigma_2^{-1}]^{-1}$, and
2. $u^* = \Sigma^*[\Sigma_1^{-1} u_1 + \Sigma_2^{-1} u_2]$.
Then $$lr_2(a,b,d) = \sum_{m_1,m_2} l^*_{m_1 m_2} \, n((a,b)|u^*_{m_1,m_2}, \Sigma^*_{m_1,m_2}) + \quad (2)$$

$$\sum_{m_2} G_1(u_{2,m_2}) l_{2,m_2} \, n((a,b)|u_{2,m_2}, \Sigma_{2,m_2}) +$$

$$\sum_{m_1} G_1(u_{2,m_2}) l_{1,m_1} \, n((a,b)|u_{1,m_1}, \Sigma_{1,m_1}) + G_1 G_2$$

Here

1. $l^*_{m_1,m_2} = \frac{l_{1,m_1} \cdot l_{2,m_2}}{(2\pi)|\Sigma_{1,m_1} + \Sigma_{2,m_2}|})^{1/2}$ $$\exp\left\{ \frac{1}{2} (u_{1,m_1} - u_{2,m_2})^T [\Sigma_{1,m_1} + \Sigma_{2,m_2}]^{-1} (u_{1,m_1} - u_{2,m_2}) \right\}$$

2. $\Sigma^*_{m_1,m_2} = [\Sigma_{1,m_1}^{-1} + \Sigma_{2,m_2}^{-1}]^{-1}$

3. $u^*_{m_1,m_2} = \Sigma^*_{m_1,m_2} [\Sigma_{1,m_1}^{-1} u_{1,m_1} + \Sigma_{2,m_2}^{-1} u_{2,m_2}]$ 4. $G_1 = \frac{1}{m} \sum_m G_1(u_{1,m})$ 5. $G_2 = \frac{1}{m} \sum_m G_2(u_{2,m})$ Note:

1. $1r_2(a,b,d)$ is back in the form of a linear combination of Gaussians plus a floor.

2. The linear combination of Gaussians may be pruned to retrain a fixed number of composite peaks.

That is, upon pruning $$lr_2(a,b,d) \approx \sum_m \hat{l}_m \, n((a,b)|\hat{u}_m, \hat{\Sigma}) + \hat{G}(a,b,d) \quad (3)$$

Where tile terms retained in the terms in (3) are those with the M largest coefficients in (2). Table 1 provides a graphic method for calculating expression (3). Table 2 provides the method for recursive computation of the $(k+1)^{st}$ likelihood function from the $k^{th}$.

TABLE 1
Tabular Form of Two-Epoch Calculation for Each d

|  | $l_{2,m2}(d)$<br>$u_{2,m2}(d)$<br>$\Sigma_{2,m2}(d)$ |  | $G_2(d)$ ← Epoch 2 llr |
|---|---|---|---|
|  | Updated |  | Continued |
| $l_{1,m1}(d), u_{1,m1}(d), \Sigma_{1,m1}(d)$ | ① |  | ② |
|  | New |  | No Det |
| $G_1(d)$ ↑ Epoch 1 llr | ③ |  | ④ |

1. $l^*_{m_1,m_2}(d)\ n((a,b)|u_{m_1,m_2}(d), \Sigma^*_{m_1,m_2}(d))$
2. $G_2(u_{1,m_1}(d))\ l_{1,m_1}(d)\ n((a,b)|u_{1,m_1}(d), \Sigma_{1,m_1}(d))$
3. $G_1(u_{2,m_2}(d))\ l_{2,m_2}(d)\ n((a,b)|u_{2,m_2}(d), \Sigma_{2,m_2}(d))$
4. $G_1 G_2$ Choose M highest composites from $M^2+2M$ possibilities which have largest coefficients.

TABLE 2
Tabular Form of Recursive Calculation Beyond Second Epoch for Each d

|  | $l_{k,m}(d)$<br>$u_{k,m}(d)$<br>$\Sigma_{k,m}(d)$ |  | $G_k$ ← Epoch k llr |
|---|---|---|---|
|  | Updated |  | Continued |
| $\hat{l}_m(d), \hat{u}_m(d), \hat{\Sigma}(d)$ | ① |  | ② |
|  | New |  | No Det |
| $\hat{G}$ ↑ Composites | ③ |  | ④ |

1. $l^*_{m,m_k}(d)\ n((a,b)|u^*_{m,m_k}(d), \Sigma^*_{m,m_k}(d))$
2. $G_k(\hat{u}_m(d))\ \hat{l}_m(d)\ n((a,b)|\hat{u}_m(d), \hat{\Sigma}_m(d))$
3. $\hat{G}m(u_k(d))\ l_k(d)\ n((a,b)|u_k(d), \Sigma_k(d))$
4. $\hat{G}\ G_k$ Choose M highest composites from $M^2+2M$ possibilities which have largest coefficients.

To summarize, the basic processing steps in detecting, localizing, and classifying potential targets are as follows:

For each stack

1. For each d, identify set of local peaks in $MF_t$
   — $l_{t,m}(d)$
   — $u_{t,m}(d)$
   — $\Sigma_{t,m}(d)$
2. Evaluate Ht at each peak location Recursive Calculation of Composites for each d 1. As per the tabular approach
    1. Compute Updated Composites
    2. Compute Continued Composition
    3. Compute New Composites
    4. Compute New Base
2. Prune to composite set of fixed size.
3. Continue to next stack.
4. Threshold composite 1n1r, representation to call detections.
5. Report detections (along with the associated peak location and type declaration) to the operator.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An apparatus for detecting and imaging from an airborne platform an object at least partially enveloped by water, the water having a surface and a bottom, comprising:

pulsed light source generating means for selectively generating pulses of light from the airborne platform;

projecting means for projecting said pulses of light toward the water and at an object enveloped by the water;

bottom detector means for measuring the distance between the surface and the bottom of the water defining total water depth;

camera means for detecting said pulses of light reflected back from said object, said camera means being gated open after a selected time delay corresponding to the roundtrip propagation time of said light pulses to and from said object;

compensating means for automatically compensating for variations in total water depth and platform altitude, said compensating means comprising computer means for calculating said selected time delay based on input data which includes the total water depth from said bottom detector means, said computer means inputting said selected time delay to said delay generator means; and convening means for convening said detected pulses of light to a video image of said object.

2. The apparatus of claim 1 wherein said airborne platform has instrumentation for measuring platform altitude and wherein:

said computer means monitors the altitude of the airborne platform in response to altitude input from the instrumentation and wherein said computer means calculates said selected time delay based on input data which includes the altitude input from said instrumentation.

3. The apparatus of claim 2 wherein said angular attitude input includes pitch angle and roll angle.

4. The apparatus of claim 1 wherein said airborne platform has instrumentation for measuring platform attitude and wherein:

said computer means monitors the attitude of the airborne platform in response to attitude input from the instrumentation and wherein said computer means calculates said selected time delay based on input data which includes the attitude input from said instrumentation.

5. The apparatus of claim 1 wherein said bottom detector means comprises:

optical filter means;

photomultiplier tube means or avalanche photodiode means in optical communication with said optical filter means; and preamplifier/discriminator means in optical communication with said photomultiplier tube means or said avalanche photodiode means.

6. A method for detecting and imaging from an airborne platform an object at least partially enveloped by water, the water having a surface and a bottom, comprising the steps of:

generating means for selectively generating pulses of light from the airborne platform;

projecting said pulses of light toward the water and at an object enveloped by the water;

measuring the distance between the surface and the bottom of the water defining total water depth;

detecting said pulses of light reflected back from said object using camera means, said camera means being gated open by input from delay generator means, said camera means being gated open after a selected time delay corresponding to the roundtrip propagation time of said light pulses to and from said object;

automatically compensating for variations in total water depth and platform altitude by calculating said selected time delay based on input data which includes the total water depth from said bottom detector means;

inputting said selected time delay to said delay generator means; and converting said detected pulses of light to a video image of said object.

7. The method of claim 6 wherein said airborne platform has instrumentation for measuring platform altitude and including:

monitoring the altitude of the airborne platform in response to altitude input from the instrumentation and calculating said selected time delay based on input data which includes the altitude input from said instrumentation.

8. The method of claim 6 wherein said attitude input includes pitch angle and roll angle.

9. The method of claim 6 wherein said airborne platform has instrumentation for measuring platform attitude and including:

monitoring the attitude of the airborne platform in response to attitude input from the instrumentation and calculating said selected time delay based on input data which includes the attitude input from said instrumentation.

10. The method of claim 6 wherein said bottom detector means comprises:

optical filter means;

photomultiplier tube means or avalanche photodiode means in optical communication with said optical filter means; and preamplifier/discriminator means in optical communication with said photomultiplier tube means or said avalanche photodiode means.

* * * * *